(12) United States Patent
Miyazono et al.

(10) Patent No.: US 9,625,034 B2
(45) Date of Patent: Apr. 18, 2017

(54) CONTROL DEVICE FOR STEPPED TRANSMISSION MECHANISM

(71) Applicant: JATCO Ltd, Fuji-shi, Shizuoka (JP)

(72) Inventors: Masayuki Miyazono, Isehara (JP); Hideshi Wakayama, Hadano (JP)

(73) Assignee: JATCO Ltd, Fuji-shi (JP)

( * ) Notice: Subject to any disclaimer, the term of this patent is extended or adjusted under 35 U.S.C. 154(b) by 0 days.

(21) Appl. No.: 15/022,368

(22) PCT Filed: Sep. 24, 2014

(86) PCT No.: PCT/JP2014/075169
§ 371 (c)(1),
(2) Date: Mar. 16, 2016

(87) PCT Pub. No.: WO2015/046188
PCT Pub. Date: Apr. 2, 2015

(65) Prior Publication Data
US 2016/0230884 A1    Aug. 11, 2016

(30) Foreign Application Priority Data

Sep. 30, 2013 (JP) ................................. 2013-203567

(51) Int. Cl.
| | |
|---|---|
| *F16H 61/20* | (2006.01) |
| *F16H 61/00* | (2006.01) |
| *F16H 61/70* | (2006.01) |
| *F16H 37/02* | (2006.01) |
| *F16H 59/66* | (2006.01) |

(52) U.S. Cl.
CPC ........... *F16H 61/20* (2013.01); *F16H 37/021* (2013.01); *F16H 61/0021* (2013.01); *F16H 61/0059* (2013.01); *F16H 61/702* (2013.01); *F16H 2037/023* (2013.01); *F16H 2059/663* (2013.01); *F16H 2061/205* (2013.01); *F16H 2312/04* (2013.01)

(58) Field of Classification Search
None
See application file for complete search history.

(56) References Cited

U.S. PATENT DOCUMENTS

2012/0298462 A1    11/2012    Wakayama et al.

FOREIGN PATENT DOCUMENTS

| | | |
|---|---|---|
| JP | 2007-271019 A | 10/2007 |
| JP | 2010-006326 A | 1/2010 |

(Continued)

*Primary Examiner* — Erin D Bishop
(74) *Attorney, Agent, or Firm* — Foley & Lardner LLP

(57) ABSTRACT

A control device (12) for a stepped transmission mechanism is configured to perform an interlock by engaging a first clutch (32) and increasing hydraulic pressure of a second clutch (33) up to a first predetermined pressure (P1) such that an output shaft of the transmission mechanism is fixed, after an idle-stop condition including at least a requirement that a vehicle is stationary was satisfied and before a stop of an engine (1). The control device includes a gradient detecting section (12a, 47) that detects a gradient (R) of a road surface on which the vehicle is stationary; and a hydraulic control section (12c) that performs a slipping interlock by reducing the hydraulic pressure to a second predetermined pressure (P2), if the gradient R detected by the gradient detecting section is lower than or equal to a predetermined value ($R_{TH}$) during the interlock and before the stop of the engine.

5 Claims, 5 Drawing Sheets

(56) References Cited

FOREIGN PATENT DOCUMENTS

| JP | 2010-014168 A | 1/2010 |
|----|---------------|--------|
| JP | 2010-144779 A | 7/2010 |
| JP | 2011-185379 A | 9/2011 |

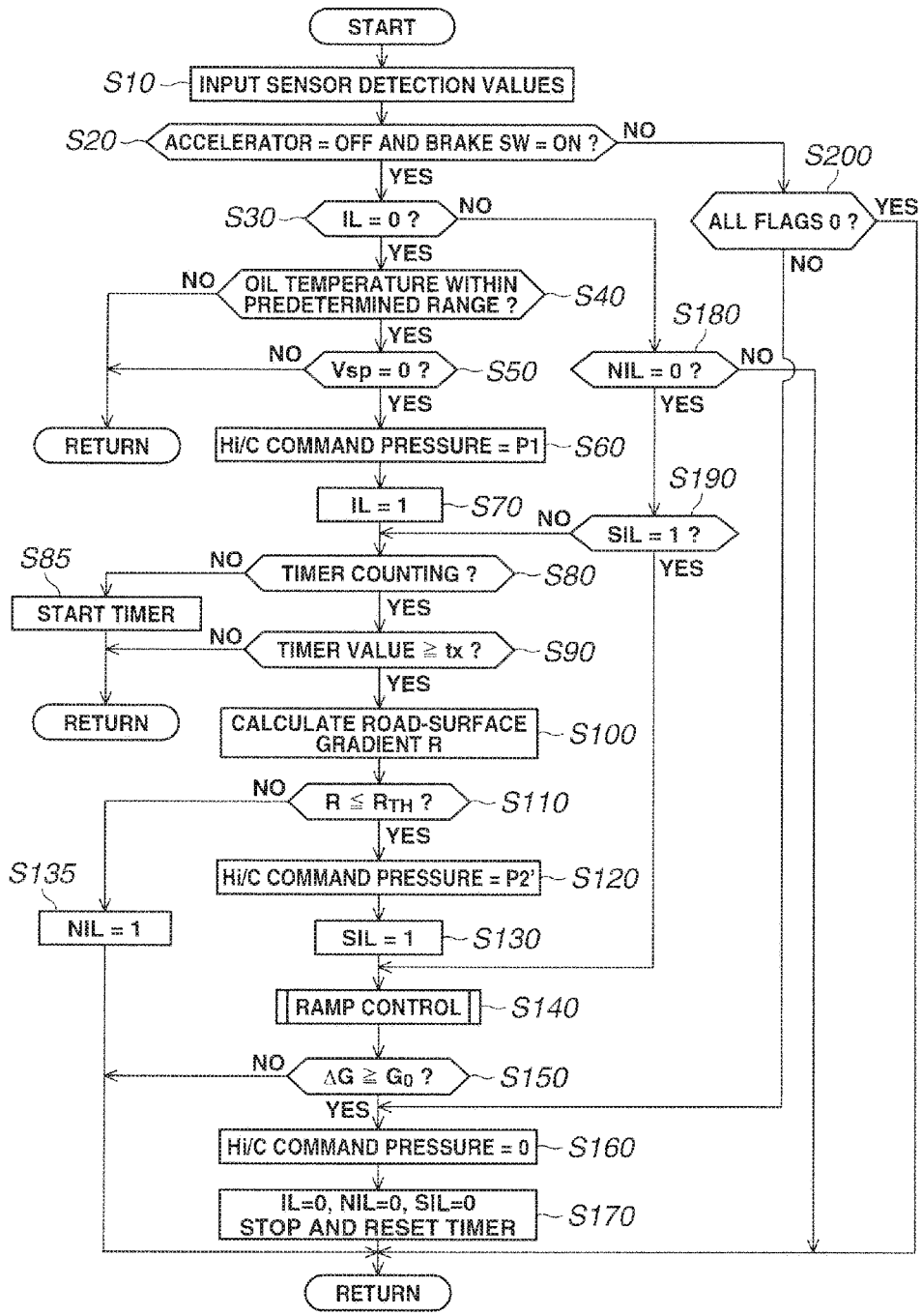

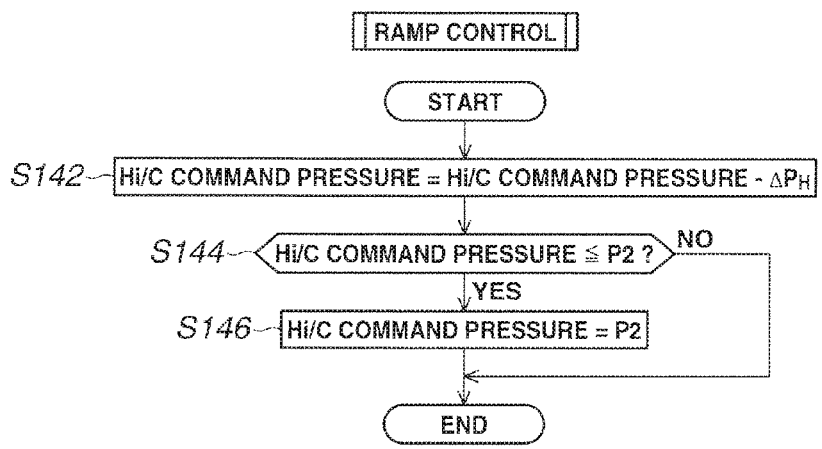
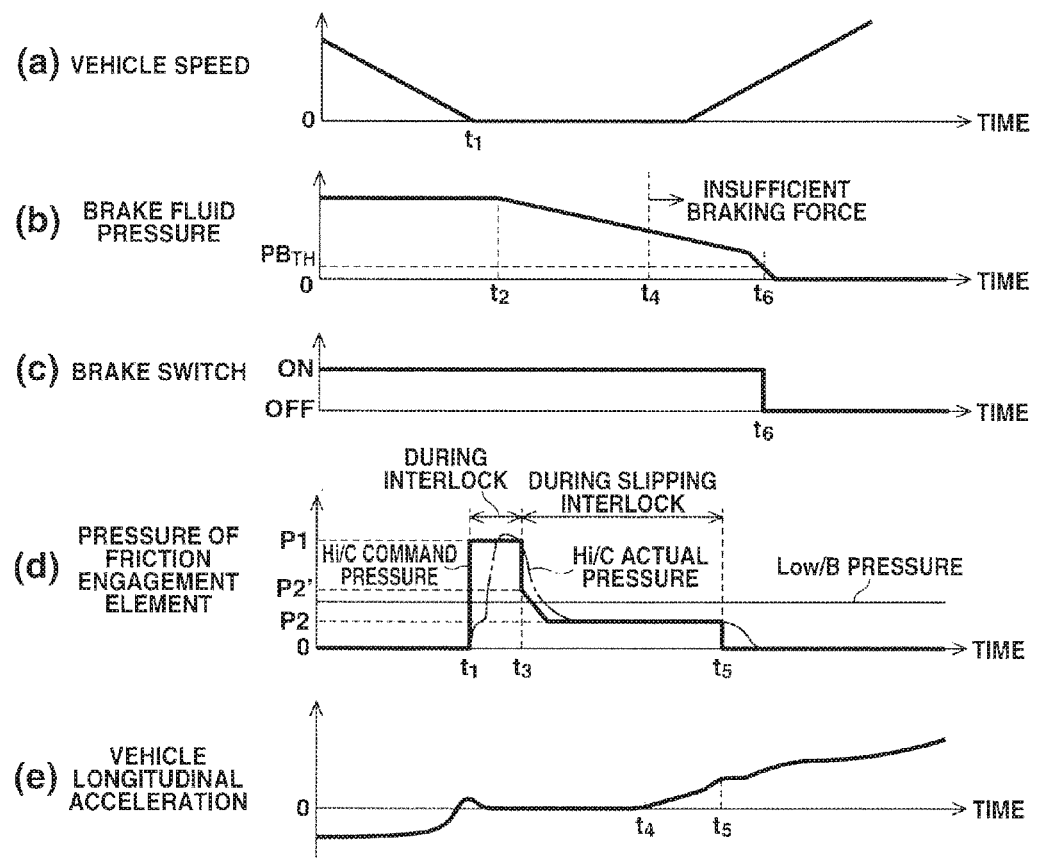

CONTROL DEVICE FOR STEPPED TRANSMISSION MECHANISM

TECHNICAL FIELD

The present invention relates to a control device for a stepped transmission mechanism, which is provided in a vehicle having an idle stop function.

BACKGROUND ART

Recently, a vehicle having an idle stop function to automatically stop an engine when the vehicle is stationary because of waiting for a traffic light or the like has been put into practical use for purpose of improvements in fuel economy and environmental performance. Moreover, in the vehicle having such an idle stop function, an automatic transmission in which a continuously-variable transmission mechanism (continuously-variable shift mechanism, hereinafter referred to as "variator") and a stepped transmission mechanism (stepped shift mechanism, hereinafter referred to as "subtransmission mechanism") are disposed in series with each other is mounted. (for example, see Patent Literature 1)

In the vehicle disclosed in Patent Literature 1, an interlock state in which rotation of an output shaft of the subtransmission mechanism is fixed is realized by fully engaging a first clutch and a second clutch under an idle-stop control (i.e. during engine stop). The first clutch is configured to be engaged when the vehicle starts moving, and the second clutch is provided separately from the first clutch. Moreover, when the idle-stop control is terminated, the subtransmission mechanism is made to be in a slipping interlock state by bringing the second clutch into a slipping state instead of the fully-engaged state while keeping the first clutch in the fully-engaged state. Accordingly, when the idle-stop control is terminated, a push-up feeling of a driver can be reduced and hence a strangeness feeling of a driver can be reduced, according to teachings of Patent Literature 1.

In general, the idle-stop control is executed to automatically stop the engine in a situation where a vehicle speed has become equal to 0 by brake manipulation and in a situation where the vehicle does not start moving by itself even if the engine is stopped. In the technique of Patent Literature 1, the subtransmission mechanism is controlled to become in the interlock state when the vehicle speed becomes equal to 0 by the brake manipulation. At this time, it is desirable that a hydraulic pressure which reliably prevents the vehicle from moving is supplied to the clutch which is engaged for the interlock, according to teachings of Patent Literature 1. Accordingly, for example, even if the vehicle is stationary on a sloping road, the vehicle is kept not to start moving by its own weight during the interlock. The interlock is released when a brake switch becomes in an OFF state, and hence the vehicle can start moving when the brake switch becomes in the OFF state.

A case can sometimes occur that the subtransmission mechanism becomes in the interlock state because of an ON state of the brake switch and a zero state of the vehicle speed and then the vehicle starts moving again without automatically stopping the engine. In such a case, the interlock needs to be promptly released to start the vehicle, when the brake switch becomes in the OFF state before the stop of the engine.

However, the brake switch is normally switched between the ON state and the OFF state according to a level of brake fluid pressure. Hence, the brake fluid pressure is sometimes insufficient even when the brake switch is in ON state. For example, if a depressed brake pedal is slowly released, the brake fluid pressure is gradually reduced and thereby a braking force sometimes becomes insufficient although the brake switch is in ON state. That is, a gap is sometimes caused between an actual braking force and an ON/OFF information of the brake switch.

Thus, in the case that the actual braking force is insufficient although the brake switch is in ON state, the vehicle is supported by the interlocked subtransmission mechanism. For example, in the case that the vehicle is stationary on a sloping road, torque applied to road-wheels is inputted through a driveshaft into the subtransmission mechanism. In this state, if the brake fluid pressure further decreases such that the brake switch is changed from the ON state to the OFF state, the interlock is released. Hence, the torque inputted into the subtransmission mechanism is released in one shot, so that torque is rapidly transferred in the automatic transmission with a torsional motion of the driveshaft. These rapid torque transfer and torsional motion of the driveshaft influence a behavior of the vehicle as a shock. As a result, a feeling of knocking (pushing) in a frontward direction is given to a driver.

In order to avoid this shock, it is conceivable that the interlock is gradually released from a time point when the brake switch is changed from the ON state to the OFF state. However, if the release of the interlock takes plenty of time, a startability of the vehicle is worsened at the time of release of the brake pedal. Therefore, it is desired that the startability is ensured at the time of release of the brake pedal while suppressing the shock which is caused due to the release of the interlock (i.e. at the time of movement start of the vehicle).

The existence of such a problem is not limited to the subtransmission mechanism provided to the variator. A similar problem exists also against a general stepped automatic transmission mechanism as long as this transmission mechanism is configured to become in the interlock state when the vehicle is stationary.

CITATION LIST

Patent Literature

Patent Literature 1: Japanese Patent Application Publication No. 2011-185379

SUMMARY OF THE INVENTION

It is therefore an object of the present invention to provide a control device for a stepped transmission mechanism, devised to improve the startability by suppressing a shock at the time of movement start of a vehicle. It is noted that advantageous effects which are produced by respective configurations in an after-described embodiment and which are not obtained by conventional technology can be another object(s) of the present invention.

(1) According to one aspect of the present invention, there is disclosed a control device for a stepped transmission mechanism wherein the control device is mounted in a vehicle having an idle stop function, the control device is configured to perform an interlock by engaging a first clutch and increasing hydraulic pressure of a second clutch up to a first predetermined pressure such that an output shaft of the transmission mechanism is fixed, after an idle-stop condition including at least a requirement that the vehicle is stationary was satisfied and before a stop of an engine, the first clutch is configured to be used for a movement start of the vehicle, and the second clutch is provided separately from the first clutch.

The control device comprises: a gradient detecting means that detects a gradient of a road surface on which the vehicle is stationary; and a hydraulic control means that performs a slipping interlock such that a slipping state is realized by reducing the hydraulic pressure to a second predetermined pressure which is lower than the first predetermined pressure, if the gradient detected by the gradient detecting means is lower than or equal to a predetermined value during the interlock and before the stop of the engine.

(2) It is favorable that the stepped transmission mechanism is a subtransmission mechanism connected to an output side of a continuously-variable transmission mechanism which is configured to change a rotational speed of the engine in a stepless manner.

(3) It is favorable that the control device further comprises a sensing means that senses a movement start of the vehicle, and the hydraulic control means is configured to release the slipping interlock by further reducing the hydraulic pressure, if the sensing means senses the movement start of the vehicle when the hydraulic pressure is controlled to be equal to the second predetermined pressure.

(4) It is favorable that the hydraulic control means is configured to maintain the hydraulic pressure at the first predetermined pressure, if the gradient detected by the gradient detecting means is higher than the predetermined value during the interlock and before the stop of the engine.

(5) It is favorable that the gradient detected by the gradient detecting means is lower than or equal to the predetermined value when the vehicle is on a flat road or a downslope.

According to the disclosed control device for a stepped transmission mechanism, the startability of the vehicle can be improved with a suppression of the shock when the vehicle starts moving.

BRIEF EXPLANATION OF DRAWINGS

FIG. 3 An example of flowchart related to an interlock control which is executed in the control device for the stepped transmission mechanism in the embodiment.

FIG. 4 A sub-flowchart of FIG. 3.

FIG. 5 A time chart for explaining control operations of the control device for the stepped transmission mechanism in the embodiment. (a) shows a vehicle speed, (b) shows a brake fluid pressure, (c) shows a brake switch (brake SW), (d) shows pressures of friction engagement elements, and (e) shows a longitudinal acceleration of the vehicle.

DETAILED EXPLANATION OF THE INVENTION

Figure 1:
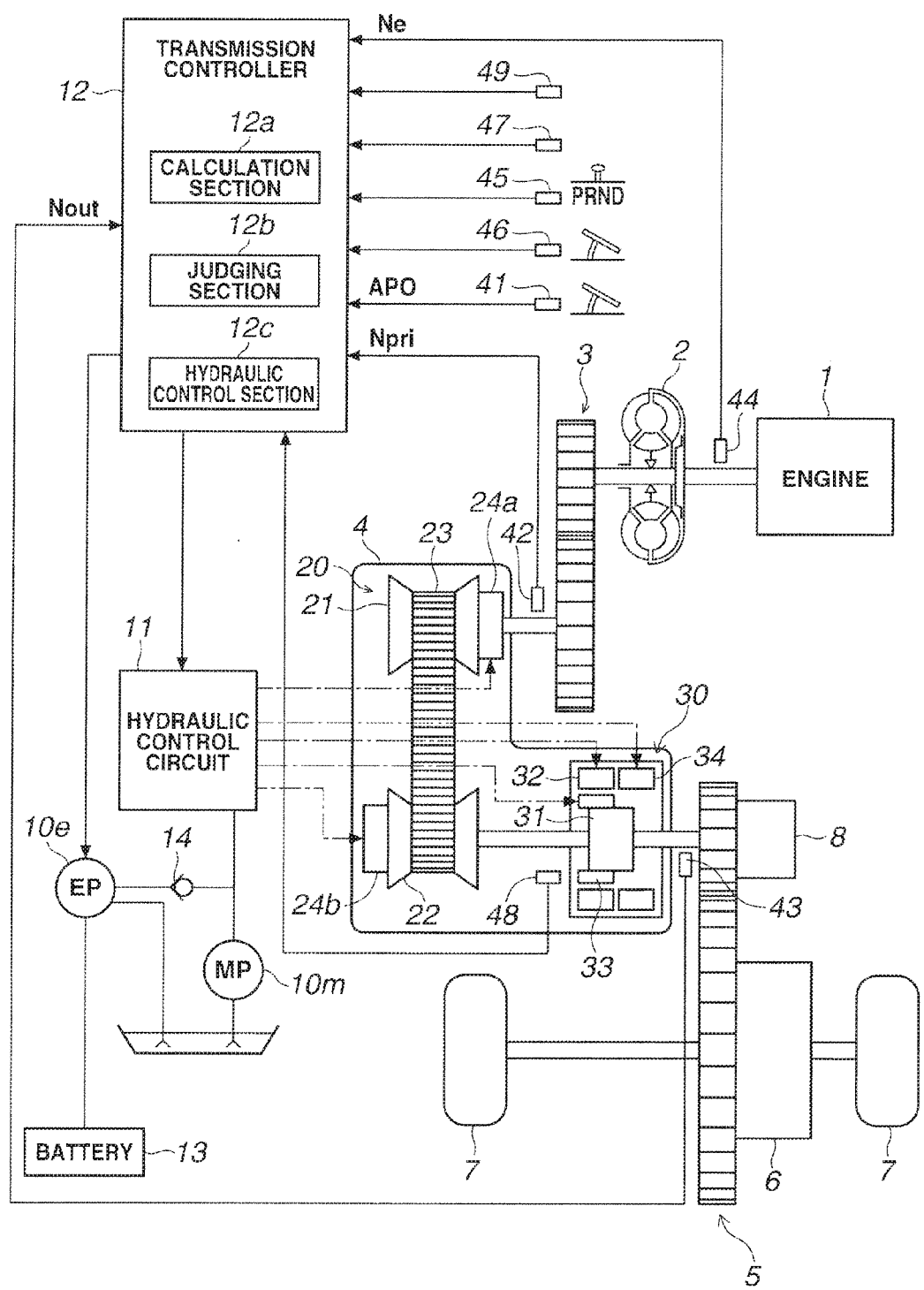
FIG. 1 A schematic configuration diagram of a vehicle equipped with a control device for a stepped transmission mechanism in an embodiment according to the present invention.

Hereinafter, embodiments according to the present invention will be explained referring to the drawings. It is noted that the following embodiments are just examples, and hence various variations or technical applications thereof which are not clearly mentioned in the following embodiments are not excluded according to the present invention. Respective configurations in the following embodiments can be modified in a variety of fashions within scope of ideas of the embodiments, can be employed or omitted as needed, and can be appropriately re-combined.

[1. Device Configuration]

FIG. 1 is a schematic configuration diagram of a vehicle equipped with a control device for a stepped transmission mechanism in an embodiment according to the present invention. As shown in FIG. 1, the vehicle includes an engine (internal combustion engine) 1 as a drive source. An output rotation of the engine 1 is transmitted through a torque converter 2 having a lockup clutch, a first gear train 3, a continuously variable transmission 4 (hereinafter simply referred to as "transmission 4"), a second gear train 5 and a final reduction gear unit 6 to drive (road-)wheels 7. The second gear train 5 is provided with a parking mechanism 8 which mechanically locks an output shaft of the transmission 4 to disable a rotation of the output shaft of the transmission 4 when the vehicle is parked.

The vehicle includes an idle stop function. By this idle stop function, the engine 1 is automatically stopped when a predetermined idle-stop condition is satisfied, and is automatically restarted when a predetermined restart condition is satisfied. The idle-stop condition includes, for example, a requirement that a brake switch is in ON state, a requirement that the vehicle is in a stopped state (namely, a requirement that a vehicle speed is equal to 0), and the like. In the device according to this embodiment, the idle-stop condition further includes a requirement that a brake depressing force is greater than or equal to a predetermined value in addition to the requirement that the brake switch is in ON state. Moreover, the restart condition includes, for example, a requirement that the brake switch is in OFF state, a requirement that an accelerator opening is not equal to 0, and the like.

The vehicle includes an engine control unit (not shown). The engine control unit is an electronic control unit that comprehensively controls a wide range of systems such as a fuel system, an ignition system, an intake-and-exhaust system and a valve system related to the engine 1. That is, the engine control unit controls an air quantity and a fuel injection quantity which are supplied to each cylinder of the engine 1, an ignition timing of each cylinder, a supercharging pressure, and the like. The engine control unit controls automatic stop and restart of the engine 1 by judging the above-mentioned idle-stop condition and the like.

The vehicle includes a mechanical oil pump 10m and an electric oil pump 10e. The mechanical oil pump 10m is driven by use of a part of power of the engine 1 whereas the electric oil pump 10e is driven by an electric motor. The vehicle further includes a hydraulic control circuit 11 and a transmission controller 12. The hydraulic control circuit 11 adjusts oil pressure derived from the mechanical oil pump 10m or the electric oil pump 10e, and supplies the adjusted oil pressures to respective parts of the transmission 4. The transmission controller 12 controls the hydraulic control circuit 11 and the like.

The electric oil pump 10e is driven by the electric motor which uses electric power of a battery 13 as its drive source. The electric oil pump 10e supplies oil to the hydraulic control circuit 11 so as to generate oil pressures (i.e. supplies oil pressure to the hydraulic control circuit 11). The electric oil pump 10e supplies oil pressure to the hydraulic control circuit 11 in place of the mechanical oil pump 10m, for example when the engine 1 is automatically stopped by an idle-stop control and thereby the mechanical oil pump 10*m* is unable to supply oil pressure. A check valve 14 is provided on a flow passage through which oil discharged from the electric oil pump 10*e* flows.

The transmission 4 includes a belt-type continuously-variable transmission mechanism 20 (hereinafter referred to as "variator 20") and a subtransmission mechanism (stepped transmission mechanism) 30. The subtransmission mechanism 30 is arranged in series with the variator 20. This phrase "arranged in series with" means that the variator 20 is serially connected with the subtransmission mechanism 30 in a power transfer path ranging from the engine 1 to the drive wheels 7. In this example, the subtransmission mechanism 30 is directly connected with an output shaft of the variator 20. It is noted that the subtransmission mechanism 30 may be connected through the other transmission mechanism(s) or power transfer mechanism(s) (e.g. gear train) to the variator 20.

The variator 20 has a continuously-variable shift function which changes a speed ratio (transmission ratio) in a stepless manner. That is, the speed ratio which is a ratio between an input rotational speed of the transmission and an output rotational speed of the transmission (i.e. Transmission Input Speed/Transmission Output Speed) is continuously changed by the variator 20 by way of change of its belt contact radius. The variator 20 includes a primary pulley 21, a secondary pulley 22, and a V-belt 23. The V-belt 23 is provided between the primary pulley 21 and the secondary pulley 22 and wound around these two pulleys 21 and 22.

Each of the primary pulley 21 and the secondary pulley 22 includes a fixed conical disc, a movable conical disc and a hydraulic cylinder 24*a*, 24*b*. The movable conical disc is disposed such that a sheave surface of the movable conical disc faces a sheave surface of the fixed conical disc, so that a V-groove is formed between the movable conical disc and the fixed conical disc. Each of the hydraulic cylinders 24*a* and 24*b* is provided on a back surface of the corresponding movable conical disc, and moves this movable conical disc in an axial direction by means of adjusted oil pressure supplied to the hydraulic cylinder 24*a*, 24*b*. The oil pressure that is supplied to each of the hydraulic cylinders 24*a* and 24*b* is controlled by the transmission controller 12. Accordingly, a width of the V-groove is varied to vary the contact radius between the V-belt 23 and the pulley 21, 22. As a result, the speed ratio of the variator 20 is varied continuously (in a stepless manner).

The subtransmission mechanism 30 is a stepped transmission mechanism which realizes two forward speeds and one reverse speed. The subtransmission mechanism 30 includes a Ravigneaux-type planetary gear mechanism 31 and a plurality of friction engagement elements 32 to 34. In the Ravigneaux-type planetary gear mechanism 31, carriers of two planetary gears are connected with each other. The plurality of friction engagement elements 32 to 34 are connected with a plurality of rotational elements which constitute the Ravigneaux-type planetary gear mechanism 31. The plurality of friction engagement elements 32 to 34 function to change a linkage state among the plurality of rotational elements. That is, oil pressures which are supplied to the friction engagement elements 32 to 34 are adjusted to change an engaged or released state of each of the friction engagement elements 32 to 34 as needed, so that a shift stage (stepped speed ratio) of the subtransmission mechanism 30 is changed.

In this embodiment, as the friction engagement elements, there are provided a Low-brake (first clutch) 32, a High-clutch (second clutch) 33 and a Rev-brake 34. It is noted that the High-clutch 33 is a separate member from the Low-brake 32. The Low-brake 32, the High-clutch 33 and the Rev-brake 34 produce transfer torques according to oil pressures supplied to the Low-brake 32, the High-clutch 33 and the Rev-brake 34. These oil pressures which are supplied to the Low-brake 32, the High-clutch 33 and the Rev-brake 34 are controlled by the transmission controller 12.

For example, if the Low-brake 32 is engaged and the High-clutch 33 and the Rev-brake 34 are released, then the shift stage of the subtransmission mechanism 30 realizes a first-speed. Because the shift stage of the subtransmission mechanism 30 is usually set at the first-speed when the vehicle starts, only the Low-brake 32 is engaged when the vehicle starts. Moreover, if the High-clutch 33 is engaged and the Low-brake 32 and the Rev-brake 34 are released, then the shift stage of the subtransmission mechanism 30 realizes a second-speed which has a speed ratio smaller than the first-speed. Moreover, if the Rev-brake 34 is engaged and the Low-brake 32 and the High-clutch 33 are released, then the shift stage of the subtransmission mechanism 30 realizes a reverse running of the vehicle.

The hydraulic control circuit 11 includes a plurality of flow passages and a plurality of hydraulic control valves. The hydraulic control circuit 11 switches supplying paths for oil pressures by the plurality of hydraulic control valves controlled based on shift control signals derived from the transmission controller 12, so that necessary oil pressures are produced from oil pressure generated by the mechanical oil pump 10*m* and/or the electric oil pump 10*e*. The produced oil pressures are supplied to the respective parts (the hydraulic cylinders 24*a* and 24*b* and the friction engagement elements 32 to 34) of the transmission 4. Thus, the speed ratio of the variator 20 and the shift stage of the subtransmission mechanism 30 are changed, so that a shift of the transmission 4 is carried out.

Figure 2:
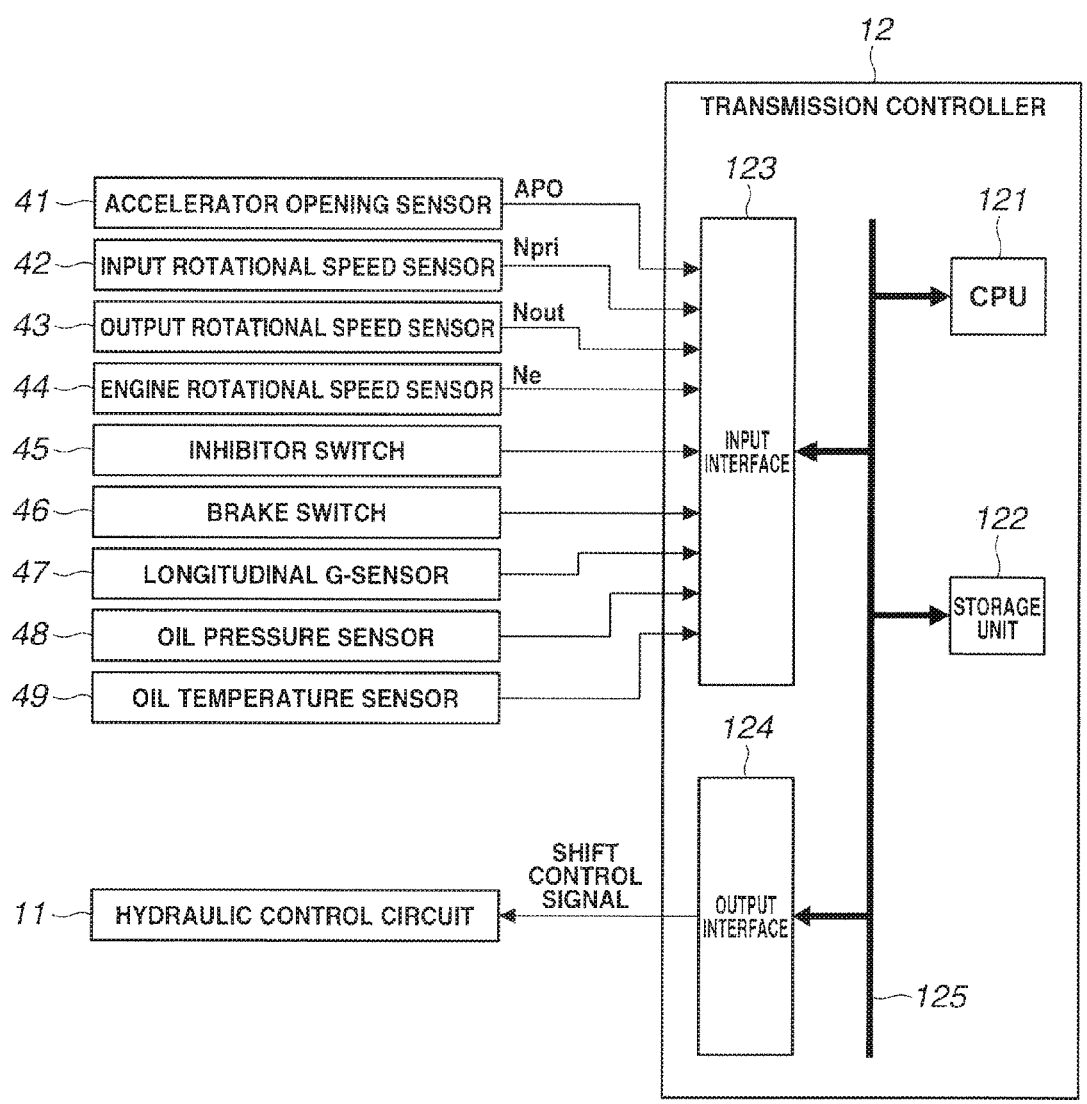
FIG. 2 A schematic configuration diagram of a transmission controller of the control device for the stepped transmission mechanism in the embodiment.

FIG. 2 shows a hardware configuration of the transmission controller 12. The transmission controller 12 includes a CPU 121, a storage unit 122 constituted by RAM and ROM, an input interface 123, and an output interface 124, all of which are embedded in the transmission controller 12. The CPU 121, the storage unit 122, the input interface 123 and the output interface 124 are connected through an internal bus 125 with one another such that communications therebetween are possible. The input interface 123 of the transmission controller 12 is connected with various kinds of sensors such as an accelerator opening sensor 41, an input rotational speed sensor 42, an output rotational speed sensor 43, an engine rotational speed sensor 44, an inhibitor switch 45, a brake switch 46, a longitudinal acceleration sensor (G-sensor) 47, an oil pressure sensor 48 and an oil temperature sensor 49. Sensor information and switch information detected by these sensors are received by the input interface 123 of the transmission controller 12.

The accelerator opening sensor 41 detects a depression amount (accelerator opening APO) of an accelerator pedal (not shown). The accelerator opening APO is a parameter which corresponds to a driver's intention to accelerate or start the vehicle. The input rotational speed sensor (sensing means) 42 is a sensor for sensing an input rotational speed Npri of the transmission 4. By use of pulse signal outputted from this input rotational speed sensor 42, a movement start of the vehicle is detected. The output rotational speed sensor 43 is a sensor for sensing a rotation of the output shaft of the transmission 4 as an output rotational speed Nout. From this output rotational speed Nout, the vehicle speed Vsp is calculated. The engine rotational speed sensor 44 detects, for example, the number of revolutions per unit time of a crankshaft as an engine rotational speed Ne.

The inhibitor switch 45 detects a position (range position) of a shift lever (select lever) which is selected by a driver. Then, the inhibitor switch 45 outputs a range-position signal according to the range position. The brake switch 46 is an ON/OFF switch for detecting a depression of a foot brake. The brake switch 46 outputs an ON-signal if a brake fluid pressure is larger than or equal to a predetermined threshold value $PB_{TH}$ (i.e. if the brake depressing force is large) whereas the brake switch 46 outputs an OFF-signal if the brake fluid pressure is lower than the predetermined threshold value $PB_{TH}$ (i.e. if the brake depressing force is low).

The longitudinal G-sensor (gradient detecting means, the sensing means) 47 is a sensor for sensing a longitudinal acceleration acting on the vehicle (i.e. acceleration in a front-rear direction of the vehicle). By use of output signal of the longitudinal G-sensor 47, an inclination (gradient) of the vehicle and a behavior of the vehicle are calculated. The oil pressure sensor 48 detects the oil pressure supplied to the High-clutch 33 (hereinafter referred to as "Hi/C pressure"). Hereinafter, an actual Hi/C pressure detected by the oil pressure sensor 48 is referred to as "Hi/C actual pressure". The oil temperature sensor 49 detects a temperature of oil. Because the oil temperature influences a viscosity of oil, it is checked whether or not the oil temperature enables the oil pump 10*m* or 10*e* to properly operate, by use of the oil temperature sensor 49.

Control programs for controlling the subtransmission mechanism 30 and the like are already stored in the storage unit 122. The CPU 121 reads the control programs from the storage unit 122 and executes the read programs. Then, the CPU 121 carries out various kinds of arithmetic processing based on various kinds of signals received through the input interface 123, and thereby produces control signals. Then, the CPU 121 outputs the produced control signals through the output interface 124 to the hydraulic control circuit 11 and the electric oil pump 10*e*, and the like. Various values which are used in the arithmetic processing by the CPU 121 and those arithmetic results are stored in the storage unit 122 as appropriate.

[2. Control Summary]

The transmission controller 12 according to this embodiment controls the subtransmission mechanism 30 to realize an interlock state of the subtransmission mechanism 30, by adjusting the respective oil pressures which are supplied to the Low-brake 32 and the High-clutch 33 of the subtransmission mechanism 30, on the basis of the sensor information and switch information of the various kinds of sensors 41 to 49. Hereinafter, this control is referred to as "interlock control". In the interlock control, the subtransmission mechanism 30 is controlled to become in the interlock state or in a slipping interlock state. Hereinafter, "to become in the interlock state" is also referred to as "interlocked", and "to become in the slipping interlock state" is also referred to as "slip-interlocked".

The interlock state is a state where both of the Low-brake 32 and the High-clutch 33 are in a fully-engaged state so that an output shaft of the subtransmission mechanism 30 is fastened. The subtransmission mechanism 30 is interlocked by adjusting the oil pressure of the Low-brake 32 (hereinafter referred to as "Low/B pressure") to a predetermined pressure $P_{LOW}$ and adjusting the Hi/C pressure to a first predetermined pressure P1. When the subtransmission mechanism 30 is interlocked, driving force generated in the engine 1 is not transmitted to the drive wheels 7. In this embodiment, the Low/B pressure is controlled to have a substantially constant level equal to the predetermined pressure $P_{LOW}$ before and after a start of the interlock. The first predetermined pressure P1 is a pressure level necessary to reliably stop the vehicle, and is higher than the predetermined pressure $P_{LOW}$ of the Low-brake 32.

A start condition of the interlock is satisfied if all of the following IL start requirements 1 to 5 are satisfied. That is, when all of the IL start requirements 1 to 5 are satisfied, a command value for the Hi/C pressure (hereinafter referred to as "Hi/C command pressure") is set at the first predetermined pressure P1 so that the interlock is started.

IL start requirement 1: Engine 1 is in operation (before engine stop).

IL start requirement 2: Accelerator is in OFF state. (APO=0)

IL start requirement 3: Brake switch is in ON state.

IL start requirement 4: Vehicle speed Vsp is equal to zero. (Vsp=0)

IL start requirement 5: Oil temperature is within a predetermined range.

The IL start requirements 2 to 5 are also included in the above-mentioned idle-stop condition. In this embodiment, the idle-stop condition further includes a requirement that the brake pedal has been depressed to a degree necessary to prevent a downward movement (by gravity) of the vehicle even if the engine 1 is stopped, in addition to the IL start requirements 2 to 5. It is determined that this requirement is satisfied, for example, when an actual value of the brake depressing force is larger than a threshold value of the brake depressing force which is calculated according to a road-surface gradient R. When this requirement and also the IL start requirements 2 to 5 are all satisfied, the engine 1 is automatically stopped (deactivated). It is noted that the actual value of the brake depressing force is obtained, for example, from a detection value of a depressing-force sensor or a brake fluid-pressure sensor or a pedal stroke.

Therefore, before the engine 1 is automatically stopped, the subtransmission mechanism 30 is made to be in the interlock state. As mentioned later, the road-surface gradient R is calculated after a body of the vehicle becomes completely at a standstill (stationary). Hence, a time lag exists between a time point at which the subtransmission mechanism 30 is interlocked and a time point at which the engine 1 is subsequently stopped automatically. This time lag is a time interval necessary to, at least, calculate the road-surface gradient R, calculate the threshold value of the brake depressing force from the road-surface gradient R, compare this brake threshold value with the actual value of the brake depressing force, and thereby determine that the engine 1 should be automatically stopped. On the other hand, if the actual value of the brake depressing force is lower than the brake threshold value, the engine 1 is not automatically stopped because the brake depressing force is insufficient. In this case, the engine 1 remains in operation although the subtransmission mechanism 30 is interlocked.

A release condition of the interlock is satisfied if at least one of the following IL release requirements 1 and 2 is satisfied.

IL release requirement 1: Brake switch is in OFF state.

IL release requirement 2: Slipping interlock is started.

That is, if the brake switch 46 is changed from ON state to OFF state during the interlock, it is determined that the IL release requirement 1 is satisfied. Then, the Hi/C command pressure is reduced to 0 such that only the Low-brake 32 is in the engaged state. As a result, the interlock is released. Moreover, if an after-mentioned start condition of the slipping interlock is satisfied, the interlock is changed into the slipping interlock so that the interlock is released.

The slipping interlock state is defined by a state where the Low-brake 32 is fully engaged while the High-clutch 33 is not fully engaged but is slipping. The subtransmission mechanism 30 is slip-interlocked by adjusting the Low/B pressure to the predetermined pressure $P_{LOW}$ and adjusting the Hi/C pressure to a second predetermined pressure P2 which is lower than the first predetermined pressure P1. In the case that the subtransmission mechanism 30 is slip-interlocked, a part of driving force generated in the engine 1 is transmitted to the drive wheels 7. In this embodiment, the Low/B pressure is controlled to have the substantially constant level equal to the predetermined pressure $P_{LOW}$ before and after a start of the slipping interlock. The second predetermined pressure P2 is defined by a pressure level at which the High-clutch 33 is not fully engaged and also not released. That is, the second predetermined pressure P2 is defined by a pressure level at which a clearance between clutch plates of the High-clutch 33 becomes equal to 0 such that the High-clutch 33 is slipping.

The start condition of the slipping interlock is satisfied if the following SIL start requirement is satisfied during the interlock before the stop of the engine 1. That is, the slipping interlock is started, if the following SIL start requirement is satisfied in addition to the above-mentioned IL start requirements 1 to 5 after the interlock was started upon satisfaction of all the IL start requirements 1 to 5.

SIL start requirement: Road-surface gradient R is lower than or equal to a predetermined value $R_{TH}$ ($R \le R_{TH}$).

The road-surface gradient R is a gradient (inclination) of a road surface on which the vehicle is at the standstill. The road-surface gradient R is calculated based on sensor information derived from the longitudinal acceleration sensor 47. When the vehicle is at the standstill on a flat road, the road-surface gradient R is approximately equal to zero ($R \approx 0$). When the vehicle is at the standstill on a downslope, the road-surface gradient R takes a negative value (R<0). When the vehicle is at the standstill on an upslope, the road-surface gradient R takes a positive value (R>0). It is noted that the calculation of the road-surface gradient R is conducted after the vehicle body becomes completely at the standstill. That is, the calculation of the road-surface gradient R is conducted when a predetermined time tx has just elapsed from a time point when the vehicle speed Vsp became equal to 0. Hence, it is judged whether or not the SIL start requirement is satisfied, after the predetermined time tx has elapsed from a time point when the IL start requirements 1 to 5 were satisfied.

The predetermined value $R_{TH}$ of the SIL start requirement is a boundary value ($R_{TH}>0$) between the flat road and the upslope and is preset. That is, the SIL start requirement is satisfied if the road surface on which the vehicle is at the standstill forms the flat road or the downslope. Namely, at first, the subtransmission mechanism 30 is interlocked because the Hi/C command pressure is increased up to the first predetermined pressure P1 upon satisfaction of all the IL start requirements 1 to 5. Then, if the road-surface gradient R calculated when the predetermined time tx has just elapsed from the start time of the interlock is lower than or equal to the predetermined value $R_{TH}$ (if the SIL start requirement is satisfied), the Hi/C command pressure is reduced down to the second predetermined pressure P2, so that the subtransmission mechanism 30 is slip-interlocked.

When the SIL start requirement is satisfied, the Hi/C command pressure is not rapidly reduced from the first predetermined pressure P1 to the second predetermined pressure P2. That is, at this time, the Hi/C command pressure is reduced from the first predetermined pressure P1 to a pressure level P2' (hereinafter referred to as "ramp pressure P2'") which is higher than the second predetermined pressure P2. Then, the Hi/C command pressure is gradually reduced from the ramp pressure P2' toward the second predetermined pressure P2 by ramp control. Accordingly, an undershoot of the Hi/C actual pressure is suppressed.

A release condition of the slipping interlock is satisfied if at least one of the following SIL release requirements 1 and 2 is satisfied.

SIL release requirement 1: Brake switch is in OFF state.
SIL release requirement 2: Movement start of vehicle is detected.

That is, if the brake switch 46 is changed from ON state to OFF state during the slipping interlock, it is determined that the SIL release requirement 1 is satisfied. Then, the Hi/C command pressure is reduced to 0 such that only the Low-brake 32 is in the engaged state. As a result, the slipping interlock is released. Moreover, the movement start of the vehicle is detected from, for example, the pulse signal derived from the input rotational speed sensor 42 or a change rate ΔG of the longitudinal acceleration sensed by the longitudinal acceleration sensor 47. It is determined that the vehicle has started moving if the sensed pulse signal is larger than or equal to a predetermined value (pulse number) or if the change rate ΔG of the longitudinal acceleration is higher than or equal to a predetermined value $G_0$. In such a case, the Hi/C command pressure is reduced to 0 so that the slipping interlock is released.

If the SIL start requirement is not satisfied during the interlock (if the vehicle is at the standstill on the upslope), the interlock state is maintained so that the slipping interlock state is not realized. That is, in this case, the Hi/C command pressure is maintained at the first predetermined pressure P1 until the release condition of the interlock is satisfied. Accordingly, the downward movement of the vehicle in the rear direction of the vehicle (by gravity) due to sloping road is prevented.

[3. Control Configuration]

As shown in FIG. 1, as elements for carrying out the above-mentioned controls, the transmission controller 12 includes a calculation section 12a, a judging section 12b and a hydraulic control section 12c. These respective elements may be formed by electronic circuits (hardware), or may be software programs. Alternatively, a part of these functions may be provided as hardware while giving the remaining part of these functions as software programs.

The calculation section (the gradient detecting means, the sensing means) 12a calculates the road-surface gradient R at which the vehicle is at the standstill, on the basis of sensor information derived from the longitudinal acceleration sensor 47. The calculation section 12a also calculates the movement start of the vehicle on the basis of sensor information derived from the input rotational speed sensor 42 or the longitudinal acceleration sensor 47. The calculation of the road-surface gradient R is conducted when the judging section 12b outputs a command to calculate the road-surface gradient R. A calculation result of the road-surface gradient R is outputted from the calculation section 12a to the judging section 12b and is used for judging the above-mentioned SIL start requirement.

On the other hand, the movement start of the vehicle is calculated from, for example, the pulse signal derived from the input rotational speed sensor 42, the change rate ΔG of the longitudinal acceleration, the road-wheel(s), or a rotation corresponding to the road-wheel(s). In this embodiment, the movement start of the vehicle is calculated (detected) from the pulse signal derived from the input rotational speed sensor 42. The calculation (detection) of the movement start of the vehicle is conducted when the judging section 12*b* outputs a command to calculate the movement start of the vehicle. A calculation result of the movement start of the vehicle is outputted from the calculation section 12*a* to the judging section 12*b* and is used for judging the above-mentioned SIL release requirement 2.

The judging section 12*b* performs various kinds of judgments related to the interlock control, on the basis of information of the various kinds of sensors 41 to 49 and the calculation results of the calculation section 12*a*. At first, the judging section 12*b* judges whether or not each of the IL start requirements 1 to 5 is satisfied. If at least one of the IL start requirements 1 to 5 is not satisfied, any other requirement is not judged. If all of the IL start requirements 1 to 5 are satisfied, then the judging section 12*b* outputs a command to start the interlock, to the hydraulic control section 12*c*. Moreover, in this case, the judging section 12*b* outputs a command to calculate the road-surface gradient R, to the calculation section 12*a*, when the predetermined time tx has just elapsed from the time point at which all the IL start requirements 1 to 5 were satisfied.

After it is determined that all the IL start requirements 1 to 5 are satisfied, the judging section 12*b* judges whether or not the IL release requirement 1 is satisfied and also whether or not the IL release requirement 2 (i.e., the SIL start requirement) is satisfied. If the IL release requirement 1 is satisfied, the judging section 12*b* outputs a command to release the interlock, to the hydraulic control section 12*c*. On the other hand, if the IL release requirement 2 is satisfied (i.e. if the SIL start requirement is satisfied), the judging section 12*b* outputs the command to release the interlock and a command to start the slipping interlock, to the hydraulic control section 12*c*. From a time point when the SIL start requirement is satisfied, the judging section 12*b* continuously outputs a command to calculate the pulse signal derived from the input rotational speed sensor 42, to the calculation section 12*a*.

If the judging section 12*b* determines that the SIL start requirement is satisfied, the judging section 12*b* judges whether or not each of the SIL release requirements 1 and 2 is satisfied. If any one of the SIL release requirements 1 and 2 is satisfied, the judging section 12*b* outputs a command to release the slipping interlock, to the hydraulic control section 12*c*. In this embodiment, the pulse signal derived from the input rotational speed sensor 42 which is calculated by the calculation section 12*a* is used for the judgement of the SIL release requirement 2.

The hydraulic control section (hydraulic control means) 12*c* controls the interlock state of the subtransmission mechanism 30 by controlling the Hi/C pressure and the Low/B pressure on the basis of commands outputted from the judging section 12*b*. In this embodiment, the Low/B pressure is controlled such that the Low/B pressure takes a substantially constant value equal to the predetermined pressure $P_{LOW}$ regardless of the interlock control. That is, the hydraulic control section 12*c* controls only the Hi/C pressure.

The hydraulic control section 12*c* sets the Hi/C command pressure at the first predetermined pressure P1 if the hydraulic control section 12*c* receives the command to start the interlock, from the judging section 12*b*. As a result, the High-clutch 33 is fully engaged so that the subtransmission mechanism 30 is interlocked. The hydraulic control section 12*c* reduces the Hi/C command pressure from the first predetermined pressure P1 to the second predetermined pressure P2 if the hydraulic control section 12*c* receives the command to release the interlock and the command to start the slipping interlock, from the judging section 12*b*. At this time, the hydraulic control section 12*c* gradually reduces the Hi/C command pressure in order to prevent the undershoot of the Hi/C actual pressure. As a result, the High-clutch 33 becomes in a slipping state, so that the subtransmission mechanism 30 is slip-interlocked.

The hydraulic control section 12*c* reduces the Hi/C command pressure to 0 if the hydraulic control section 12*c* receives the command to release the interlock or the command to release the slipping interlock, from the judging section 12*b*. As a result, only the Low-brake 32 is kept in the engaged state, so that the interlock or the slipping interlock is released.

[4. Flowchart]

Next, an example of procedure of the interlock control which is executed in the transmission controller 12 will now be explained referring to FIGS. 3 and 4. A flowchart of FIG. 3 starts when an ignition switch (IG_SW) is turned on. The flowchart of FIG. 3 is repeatedly executed with a predetermined operation period. A flowchart of FIG. 4 is a sub-flow of the flowchart of FIG. 3.

As shown in FIG. 3, at step S10, sensor information and switch information which are detected by the various kinds of sensors 41 to 49 are inputted to the transmission controller 12. At step S20, it is judged whether or not the accelerator is in OFF state and the brake switch 46 is in ON state. If the accelerator is in OFF state and also the brake switch 46 is in ON state, the program proceeds to step S30. If the accelerator is in ON state or the brake switch 46 is in OFF state, the program proceeds to step S200.

That is, processes of the following steps S30 to S150 are executed, in the case that the accelerator opening APO is equal to 0 and also the brake switch 46 is in ON state (i.e. the brake depressing force is larger than or equal to the predetermined threshold value). The judgment of step S20 corresponds to the judgement of each of the above-mentioned IL start requirements 2 and 3, the IL release requirement 1 and the SIL release requirement 1. At step S200, it is judged whether or not all of after-mentioned flags have a status "0". When the flow of FIG. 3 starts, all the flags have been preset at 0 and therefore the first operation routine is returned.

At step S30, it is judged whether or not a flag IL has the status "0" (IL=0). The flag IL is a parameter provided for checking whether or not the subtransmission mechanism 30 is controlled to keep the interlock state by the hydraulic control section 12*c*. The status "IL=0" corresponds to an absence of the interlock state whereas a status "IL=1" corresponds to a presence of the interlock state. In the first operation routine, the program proceeds to step S40 because the interlock state is absent (IL=0).

At step S40, it is judged whether or not the oil temperature is within the predetermined range. If the oil temperature is within the predetermined range, the program proceeds to step S50. At step S50, it is judged whether or not the vehicle speed Vsp is equal to 0. The judgements of steps S40 and S50 correspond to the judgements of the above-mentioned IL start requirements 4 and 5. If at least one of the judgements of steps S40 and S50 is NO, the operation routine is returned. If the oil temperature is within the predetermined range and also the vehicle speed Vsp is equal to 0, the program proceeds to step S60. At step S60, the hydraulic control section 12*c* sets the Hi/C command pressure at the first predetermined pressure P1 so that the subtransmission mechanism 30 is interlocked. At this time, the engine 1 has not yet been stopped (deactivated) by the idle stop function (i.e. is in a pre-engine-stop state), and therefore is still in operation.

At subsequent step S70, the flag IL is set at 1 (IL=1). Then, at step S80, it is judged whether or not a counting of a timer is in operation. This timer is provided for counting (measuring) time in order to judge whether or not a swing of the vehicle body has already settled down (converged). When the program proceeds to step S80 for the first time, the counting of the timer has not yet started and hence the program proceeds to step S85. At step S85, the counting of the timer is started, and then the operation routine is returned.

In a next operation routine, the program proceeds from step S30 to step S180 because the flag IL has the status "1" (IL=1). At step S180, it is judged whether or not a flag NIL has the status "0" (NIL=0). If the flag NIL has the status "0" (NIL=0), the program proceeds to step S190. At step S190, it is judged whether or not a flag SIL has the status "1" (SIL=1). It is noted that the flags NIL and SIL are set after the judgement of the road-surface gradient R. The status "NIL=0" and the status "SIL=0" correspond to a case that the judgement of the road-surface gradient R has not yet been done. On the other hand, the status "NIL=1" corresponds to the case that the road surface forms the upslope ($R \geq R_{TH}$). The status "SIL=1" corresponds to the case that the road surface forms the flat road or the downslope ($R < R_{TH}$).

If the program was returned from step S85, the flags NIL and SIL have the status "0" (NIL=0, SIL=0) and therefore the program proceeds through step S80 to step S90. At step S90, it is judged whether or not a count value of the timer is greater than or equal to the predetermined time tx. If the count value of the timer is smaller than the predetermined time tx, the operation routine is returned. It is noted that the predetermined time tx is a waiting time necessary to cause the vehicle body to become completely stationary (i.e. to become completely at the standstill). These processes are repeatedly carried out. Then, when the count value of the timer becomes greater than or equal to the predetermined time tx, the program proceeds to step S100.

At step S100, the calculation section 12a calculates the road-surface gradient R. At subsequent step S110, it is judged whether or not the calculated road-surface gradient R is lower than or equal to the predetermined value $R_{TH}$. This judgement is the above-mentioned judgement of the SIL start requirement. If the road-surface gradient R is lower than or equal to the predetermined value $R_{TH}$, the hydraulic control section 12c realizes the slipping interlock. Specifically, the program proceeds to step S120 at which the Hi/C command pressure is set at the ramp pressure P2', and then the flag SIL is set at "1" (SIL=1) at step S130. Then, the ramp control shown in FIG. 4 is performed at step S140.

As shown in FIG. 4, at step S142, a value obtained by subtracting a predetermined value ΔPH from the Hi/C command pressure is set as an updated Hi/C command pressure. At subsequent step S144, it is judged whether or not the Hi/C command pressure set at step S142 is lower than or equal to the second predetermined pressure P2. If the Hi/C command pressure set at step S142 is higher than the second predetermined pressure P2, this operation flow ends. On the other hand, if the Hi/C command pressure set at step S142 is lower than or equal to the second predetermined pressure P2, the Hi/C command pressure is set at the second predetermined pressure P2 at step S146 and then this operation flow ends. Thus, in the case that the slipping interlock state is realized, the Hi/C command pressure is reduced down to the ramp pressure P2' in the first place and then is reduced gradually down to the second predetermined pressure P2.

On the other hand, as shown in FIG. 3, if the road-surface gradient R is higher than the predetermined value $R_{TH}$ at step S110, the program proceeds to step S135. At step S135, the flag NIL is set at 1 (NIL=1). In this case, the Hi/C command pressure is maintained at the first predetermined pressure P1 so that the interlock state is maintained. Then, the operation routine is returned. In a next operation routine or later, unless it is determined that the accelerator is in ON state or it is determined that the brake switch 46 is in OFF state at step S20, the program proceeds to step S180 and then the operation routine is returned from step S180.

That is, if it is determined that the road-surface gradient R indicates the upslope after the interlock was realized upon the vehicle stop, the interlock state is maintained until the accelerator becomes in ON state or the brake switch 46 becomes in OFF state. When the accelerator becomes in ON state or the brake switch 46 becomes in OFF state, the program proceeds from step S20 to step S200. At step S200, it is judged whether or not all of the flags IL, NIL and SIL have the status "0". In this case, the program proceeds to step S160 because the flag NIL has the status "1" (NIL=1). At step S160, the Hi/C command pressure is set at 0 so that the interlock is released. Then, at step S170, all the flags IL, NIL and SIL are reset to "0", and the timer is stopped and reset. Then, the operation routine is returned.

After the ramp control of step S140, the program proceeds to step S150. At step S150, it is judged whether or not the number of pulse signals received from the input rotational speed sensor 42 which is calculated by the calculation section 12a is larger than or equal to the predetermined value. This judgement of step S150 corresponds to the judgement of the above-mentioned SIL release requirement 2. If the number of pulse signals is smaller than the predetermined value, it is determined that the vehicle has not yet started moving and hence the operation routine is returned.

In a next operation routine, the program proceeds from step S190 to step S140 if the accelerator is kept in OFF state and also the brake switch 46 is kept in ON state. Then, the setting of the Hi/C command pressure at step S140 and the judgment at step S150 are repeated. That is, in the case that the subtransmission mechanism 30 is in the slipping interlock state, the program proceeds to step S160 when it is determined that the accelerator has become in ON state or it is determined that the brake switch 46 has become in OFF state (i.e. has been turned off) at step S20 or when it is determined that the movement start of the vehicle has been detected at step S150. At step S160, the slipping interlock state is released. At step S170, the flags IL, NIL and SIL are reset to 0, and the timer is stopped and reset. Then, the operation routine is returned.

[5. Operations]

Figure 6:
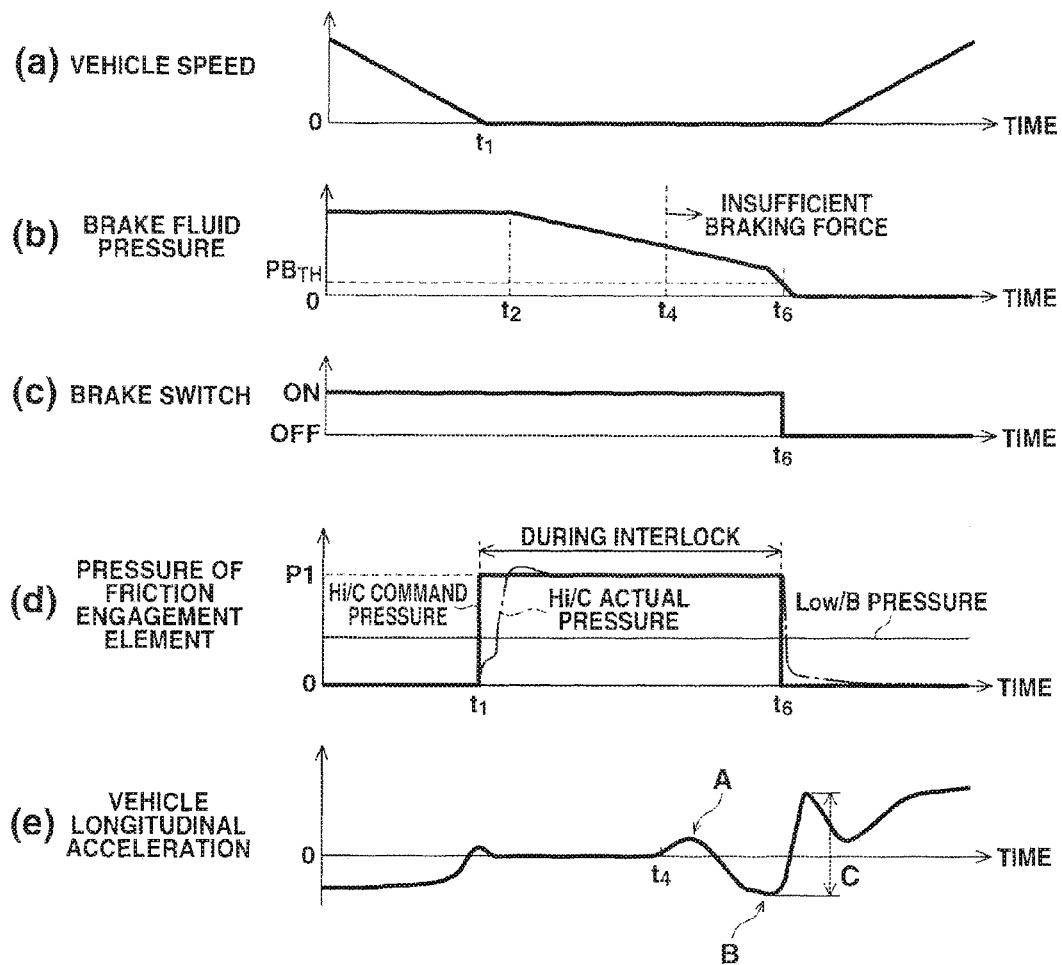
FIG. 6 A time chart for explaining control operations of a conventional control device for a stepped transmission mechanism as a comparative example. (a) shows a vehicle speed, (b) shows a brake fluid pressure, (c) shows a brake switch (brake SW), (d) shows pressures of friction engagement elements, and (e) shows a longitudinal acceleration of the vehicle.

Next, referring to FIGS. 5 and 6, the interlock control in the control device according to this embodiment will now be explained with a comparative conventional control. FIGS. 5 and 6 are examples in the case that the vehicle stops on a downslope (i.e. $R < R_{TH}$). FIG. 5 is a time chart related to the interlock control of the control device according to this embodiment. FIG. 6 is a time chart related to a conventional interlock control given as a comparative example. It is noted that the conventional interlock control is constructed such that the interlock is started when the vehicle speed Vsp becomes equal to 0 and is released when the brake switch 46 is changed to OFF state.

At first, a problem of the conventional control will be explained referring to FIG. 6. As shown in (a) to (e) of FIG. 6, when the vehicle speed Vsp becomes equal to 0 at time point t1 as a result of the OFF state of the accelerator and the depression of the brake pedal, the Hi/C command pressure is raised up to the first predetermined pressure P1. In response to this, the Hi/C actual pressure rises so that the subtransmission mechanism 30 is interlocked. Hence, even if the brake pedal is released, a movement of the vehicle can be reliably stopped by the subtransmission mechanism 30 because the Hi/C pressure has been adjusted to the first predetermined pressure P1.

If the brake depressing force is slowly reduced by a driver from time point t2, the brake fluid pressure is gradually lowered. However, as long as the brake fluid pressure is higher than or equal to the predetermined threshold value $PB_{TH}$, the brake switch 46 remains in ON state, so that the interlock state is maintained. Then, the brake fluid pressure is further lowered, and hence a braking force for keeping the vehicle stationary begins to be insufficient at time point t4 although the brake switch 46 is in ON state. At this time, torsion of a driveshaft which was produced when braking the vehicle is released.

Accordingly, as shown by an arrow A in FIG. 6(e), a positive acceleration is applied to the vehicle. However, at this time, a force (reaction force) for stopping the driveshaft acts on the vehicle because the Hi/C pressure has been adjusted to the first predetermined pressure P1 so as to interlock the subtransmission mechanism 30. Therefore, as shown by an arrow B in FIG. 6(e), a negative acceleration is applied to the vehicle.

If the brake fluid pressure becomes lower than the predetermined threshold value $PB_{TH}$ at this time (time point t6), the brake switch 46 is changed to OFF state. Hence, the interlock is released. That is, the Hi/C pressure is rapidly released (Hi/C command pressure=0) when the brake switch 46 is changed to OFF state. Accordingly, as shown by an arrow C in FIG. 6(e), a large acceleration-level difference (knocking-up G) is applied to the vehicle, resulting in a shock at the time of movement start of the vehicle.

Contrarily, the control device according to this embodiment can suppress the shock at the time of movement start of the vehicle. That is, as shown by (a) to (e) of FIG. 5, when the vehicle speed Vsp becomes equal to 0 at time point t1 as a result of the OFF state of the accelerator and the depression of the brake pedal, the Hi/C command pressure is raised up to the first predetermined pressure P1. In response to this, the Hi/C actual pressure rises so that the subtransmission mechanism 30 is interlocked. Hence, even if the brake pedal is released, a movement of the vehicle can be reliably stopped by the subtransmission mechanism 30 because the Hi/C pressure has been adjusted to the first predetermined pressure P1.

If the brake depressing force is slowly reduced by a driver from time point t2, the brake fluid pressure is gradually lowered. However, because the brake fluid pressure is higher than or equal to the predetermined threshold value $PB_{TH}$, the brake switch 46 remains in ON state. At time point t3 at which the predetermined time tx has just elapsed from time point t1 at which the interlock was started, the gradient R of a road surface on which the vehicle is stationary (at a standstill) is calculated. Then, the judgment of the road-surface gradient R is carried out.

Because the vehicle is stationary on the downslope in this case, the SIL start requirement is satisfied. Hence, at time point t3, the state of the subtransmission mechanism 30 is changed from the interlock to the slipping interlock. Thereby, the Hi/C command pressure is reduced down to the second predetermined pressure P2 through the ramp control. That is, at time point t3, at first, the Hi/C command pressure is reduced from the first predetermined pressure P1 to the ramp pressure P2' in one shot. Next, the Hi/C command pressure is reduced in a slanted manner. Finally, the Hi/C command pressure is controlled to constantly keep the second predetermined pressure P2. Therefore, the undershoot of the Hi/C actual pressure is prevented.

From this state, the brake fluid pressure is further lowered, and hence the braking force for keeping the vehicle stationary begins to be insufficient at time point t4 although the brake switch 46 is in ON state. At this time, torsion of the driveshaft which was produced when braking the vehicle is released. Accordingly, as shown in FIG. 5(e), a positive acceleration is applied to the vehicle. At this time, a movement of the vehicle is not stopped such that the vehicle starts moving in a frontward direction because the subtransmission mechanism 30 is in the slipping interlock state.

When the movement start of the vehicle is detected at time point t5, the Hi/C command pressure is released (Hi/C command pressure=0). At this time, the slipping interlock is released so that the vehicle starts a creep running. Then, when the brake fluid pressure becomes lower than the predetermined threshold value $PB_{TH}$ at time point t6, the brake switch 46 is changed to OFF state.

It is noted that, if a driver strongly depresses the brake pedal again when the creep running of the vehicle has started, the interlock is realized again because the vehicle speed Vsp becomes equal to 0. Moreover, even if the engine 1 is automatically stopped after time point t3 at which the judgment of the gradient R was done, the downward movement (by gravity) of the vehicle in the rearward direction can be reliably prevented, because the state of the subtransmission mechanism 30 is changed from the interlock to the slipping interlock only in the case of the flat road or the downslope which has a value of the gradient R lower than the predetermined value $R_{TH}$.

[6. Effects]

Therefore, according to the control device for a stepped transmission mechanism in this embodiment, when the vehicle speed Vsp becomes equal to 0 in response to the depression of the brake pedal as a result of judgment for the idle-stop control, the subtransmission mechanism 30 is interlocked before the engine 1 is stopped. At this time, the Hi/C pressure is raised up to the first predetermined pressure P1, and hence the vehicle can be certainly prevented from moving. Moreover, if the road-surface gradient R is lower than or equal to the predetermined value $R_{TH}$ even in the case that the vehicle is scheduled to start moving again without the engine stop, the subtransmission mechanism 30 is slip-interlocked by reducing the Hi/C pressure to the second predetermined pressure P2 which is lower than the first predetermined pressure P1. Accordingly, the shock that is caused when the vehicle starts moving can be suppressed. As a result, a startability (performance of movement start) of the vehicle can be improved.

Moreover, even if the braking force is insufficient although the brake switch 46 is in ON state as a result of slow release of the brake pedal, the Hi/C pressure is adjusted to the second predetermined pressure P2 if the road-surface gradient R is lower than or equal to the predetermined value $R_{TH}$. Hence, the shock at the time of movement start of the vehicle can be suppressed, so that the startability can be enhanced. In particular, the creep running starts when the braking force becomes insufficient. At this time, the vehicle can smoothly start moving because any force for stopping the creep running is not applied to the vehicle by virtue of the slipping interlock state.

Moreover, the transmission 4 is constituted by the variator 20 which changes the speed ratio (transmission ratio) in a stepless manner, and the subtransmission mechanism 30 which is provided as a stepped transmission mechanism connected to an output side of the variator 20. Therefore, the subtransmission mechanism 30 can be interlocked when the vehicle speed Vsp is equal to 0, although the transmission 4 itself functions as a continuously variable transmission. Moreover, a width of available speed ratio (transmission ratio) can be enlarged without upsizing the variator 20.

Moreover, when the movement start of the vehicle is detected in the state where the Hi/C pressure is adjusted to the second predetermined pressure P2, the Hi/C pressure is further lowered such that the slipping interlock is released. Accordingly, the startability can be further improved.

Moreover, if the road-surface gradient R is higher than the predetermined value $R_{TH}$ as a result of the gradient judgment during the interlock, the Hi/C pressure is maintained at the first predetermined pressure P1. Accordingly, the vehicle can be reliably kept stationary even when the braking force becomes insufficient. In this case, a force by which the vehicle moves in the frontward direction is cancelled out by own weight of the vehicle when the interlock is released. Hence, a feeling of knocking (acceleration-level difference) of the vehicle is lightened so that the shock can be reduced at the time of movement start of the vehicle.

Moreover, the changeover from the interlock to the slipping interlock is conducted in the case that the vehicle is stationary on the flat road or the downslope. Hence, the shock which is caused at the time of movement start of the vehicle is suppressed while certainly preventing the downward movement of the vehicle in the rear direction. Therefore, the startability can be improved.

[7. Others]

Although the embodiment according to the present invention has been explained above, the invention is not limited to the embodiment described above. Various modifications of the above embodiment are possible within ideas according to the present invention.

For example, in the above embodiment, the movement start of the vehicle is detected from the number of pulse signals outputted from the input rotational speed sensor 42 or the change rate ΔG of the longitudinal acceleration sensed by the longitudinal acceleration sensor (front-rear directional G-sensor) 47. However, a way to detect the movement start of the vehicle is not limited to this. According to the present invention, the movement start of the vehicle only has to be detected.

Moreover, the above-mentioned respective conditions (the start and release conditions of the interlock, the start and release conditions of the slipping interlock) are just given as one example. According to the present invention, the above-mentioned respective conditions do not necessarily need to be employed. For example, the other condition(s) may be added to the above-mentioned respective conditions. Alternatively, some of the above-mentioned respective conditions may be omitted. Still alternatively, the other condition(s) may be employed in place of some of the above-mentioned respective conditions.

Moreover, in the above embodiment, the predetermined value $R_{TH}$ for the road-surface gradient R is preset as the boundary value ($R_{TH}$>0) between the flat road and the upslope. However, the predetermined value $R_{TH}$ is not limited to this. For example, the predetermined value $R_{TH}$ may be set at 0 such that the changeover from the interlock to the slipping interlock is conducted only in the case of downslope.

Moreover, in the above embodiment, the subtransmission mechanism 30 provided on the output side of the variator 20 as a stepped transmission mechanism has been explained. However, the stepped transmission mechanism according to the present invention is not limited to this. That is, the present invention is also applicable to a stepped automatic transmission (i.e. a stepped shift mechanism which does not include the variator 20) configured to realize the interlock by engaging a first clutch provided for the movement start of vehicle and increasing hydraulic pressure of a second clutch provided separately from the first clutch.

Moreover, in the above embodiment, the subtransmission mechanism 30 has the two forward speeds and one reverse speed. However, the present invention is also applicable to a stepped transmission mechanism which has three or more friction engagement elements for the forward running. Moreover, in the above embodiment, the Low/B pressure is controlled to be equal to a constant value. However, according to the present invention, the Low/B pressure does not necessarily need to be controlled to be equal to a constant value.

The invention claimed is:

1. A control device for a stepped transmission mechanism, the control device being mounted in a vehicle having an idle stop function, wherein the control device is configured to perform an interlock by engaging a first clutch and increasing hydraulic pressure of a second clutch up to a first predetermined pressure such that an output shaft of the transmission mechanism is fixed, after an idle-stop condition including at least a requirement that the vehicle is stationary was satisfied and before a stop of an engine, the first clutch is configured to be used for a movement start of the vehicle, and the second clutch is provided separately from the first clutch, the control device comprising:

a gradient detecting section that detects a gradient of a road surface on which the vehicle is stationary; and a hydraulic control section that performs a slipping interlock such that a slipping state is realized by reducing the hydraulic pressure to a second predetermined pressure which is lower than the first predetermined pressure, if the gradient detected by the gradient detecting section is lower than or equal to a predetermined value during the interlock and before the stop of the engine.

2. The control device according to claim 1, wherein the stepped transmission mechanism is a subtransmission mechanism connected to an output side of a continuously-variable transmission mechanism, and the continuously-variable transmission mechanism is configured to change a rotational speed of the engine in a stepless manner.

3. The control device according to claim 1, wherein the control device further comprises a sensing section that senses a movement start of the vehicle, and the hydraulic control section is configured to release the slipping interlock by further reducing the hydraulic pressure, if the sensing section senses the movement start of the vehicle when the hydraulic pressure is controlled to be equal to the second predetermined pressure.

4. The control device according to claim 1, wherein
the hydraulic control section is configured to maintain the hydraulic pressure at the first predetermined pressure, if the gradient detected by the gradient detecting section is higher than the predetermined value during the interlock and before the stop of the engine.

5. The control device according to claim 1, wherein
the gradient detected by the gradient detecting section is lower than or equal to the predetermined value when the vehicle is on a flat road or a downslope.

* * * * *